United States Patent [19]

Wallace

[11] 4,287,026

[45] Sep. 1, 1981

[54] DESALINIZATION METHOD

[76] Inventor: William A. Wallace, 5515 N. Sagugaro, Paradise Valley, Ariz. 85253

[21] Appl. No.: 25,097

[22] Filed: Mar. 29, 1979

[51] Int. Cl.³ .............................................. B01D 3/00
[52] U.S. Cl. .................................. 203/10; 159/47 R; 203/99; 203/DIG. 17
[58] Field of Search ........................ 203/10, 11, 47, 39, 203/99, DIG. 17; 196/112; 159/1 R, 6 R, 6 WH, 11 R, 11 B, 47 R, 47 WL; 210/71; 202/167, 175, 238

[56] References Cited

U.S. PATENT DOCUMENTS

| | | | |
|---|---|---|---|
| 2,927,634 | 3/1960 | Gudheim | 159/6 R |
| 3,004,901 | 10/1961 | Nerge et al. | 159/6 R |
| 3,430,932 | 3/1969 | Kuechler | 202/238 |

*Primary Examiner*—Frank Sever
*Attorney, Agent, or Firm*—Pravel, Gambrell, Hewitt, Kirk, Kimball & Dodge

[57] ABSTRACT

A method and apparatus for desalinization of salt water to render it potable, wherein the salt water at ambient temperatures is forced through multi-stages at high centrifugal velocities, generating heat to vaporize the water to water vapor, and separating and suspending the salt and other minerals in the water vapor. The centrifugal force separates the salt and other minerals for discharge separately from the water vapor or steam so that the water vapor may be condensed to essentially mineral-free potable water.

5 Claims, 9 Drawing Figures

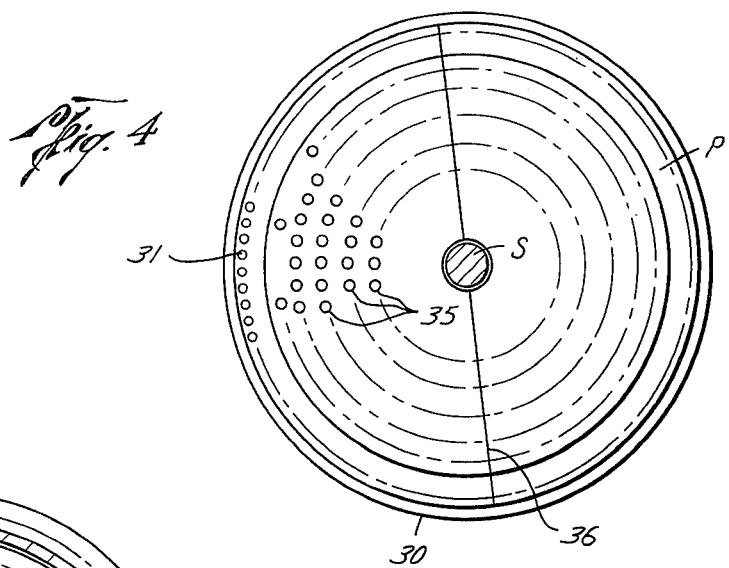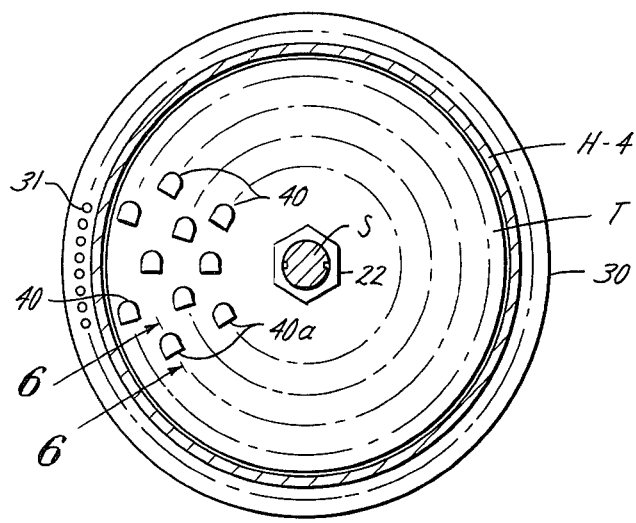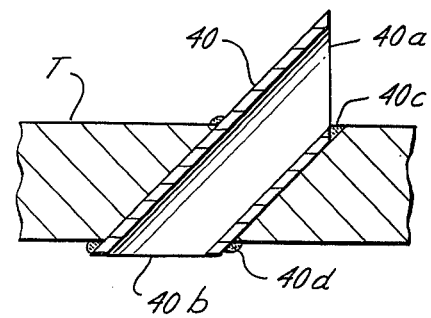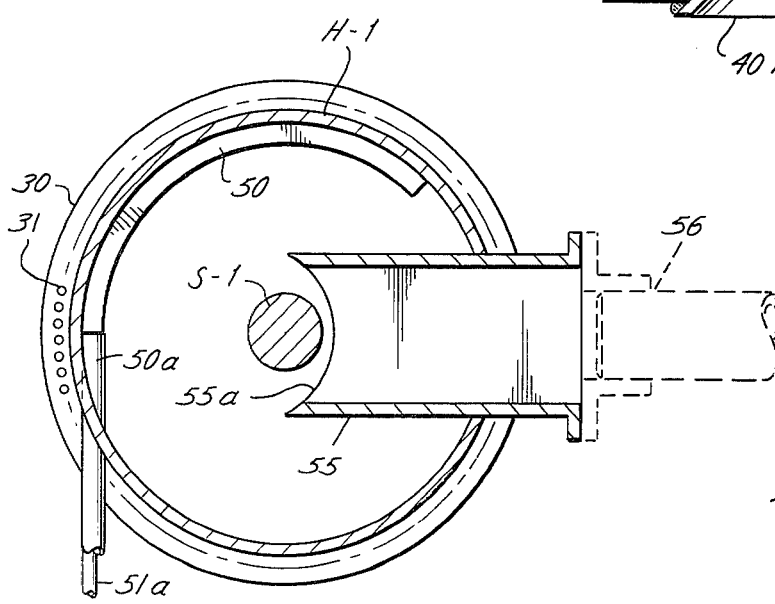

DESALINIZATION METHOD

BACKGROUND OF THE INVENTION

1. Field of Invention

The present invention relates to a method and apparatus for desalinization of salt water to render it potable.

2. Description of the Prior Art

There have been many efforts over many years to produce potable water from salt water. So far as is known, the prior efforts have been directed to evaporation-condensation processes and apparatus which involved well-known heating and cooling steps.

The apparatus disclosed in applicant's U.S. Pat. No. 3,606,596 for a multi-stage compressor has some structure in common with the apparatus of the present invention.

SUMMARY OF THE INVENTION

The present invention is directed to a new and improved method and apparatus for the removal of salt and other minerals from water to produce essentially mineral-free water. The method and apparatus involves forcing water at ambient temperature through various stages at high centrifugal velocities, preferably at least Mach 2, to efficiently separate and suspend dissolved salt and other minerals in water vapor and to centrifugally force the salt and other minerals outwardly to discharge separately from the water vapor. The steam may thereafter be condensed back to water for drinking or other use. Large quantities of water may thus be purified efficiently and economically.

BRIEF DESCRIPTION OF THE DRAWINGS

FIG. 4 is a view taken on line 4—4 of FIG. 1 to illustrate the construction of the stop-plates;

FIG. 5 is a view taken on line 5—5 of FIG. 1 to illustrate the construction of the rotatable trays with scoops therewith;

FIG. 6 is a partial sectional view taken on line 6—6 of FIG. 5 to illustrate one of the scoops on the rotatable tray of FIG. 5;

FIG. 7 is a view taken on line 7—7 of FIG. 1;

DESCRIPTION OF THE PREFERRED EMBODIMENT

Figure 1:
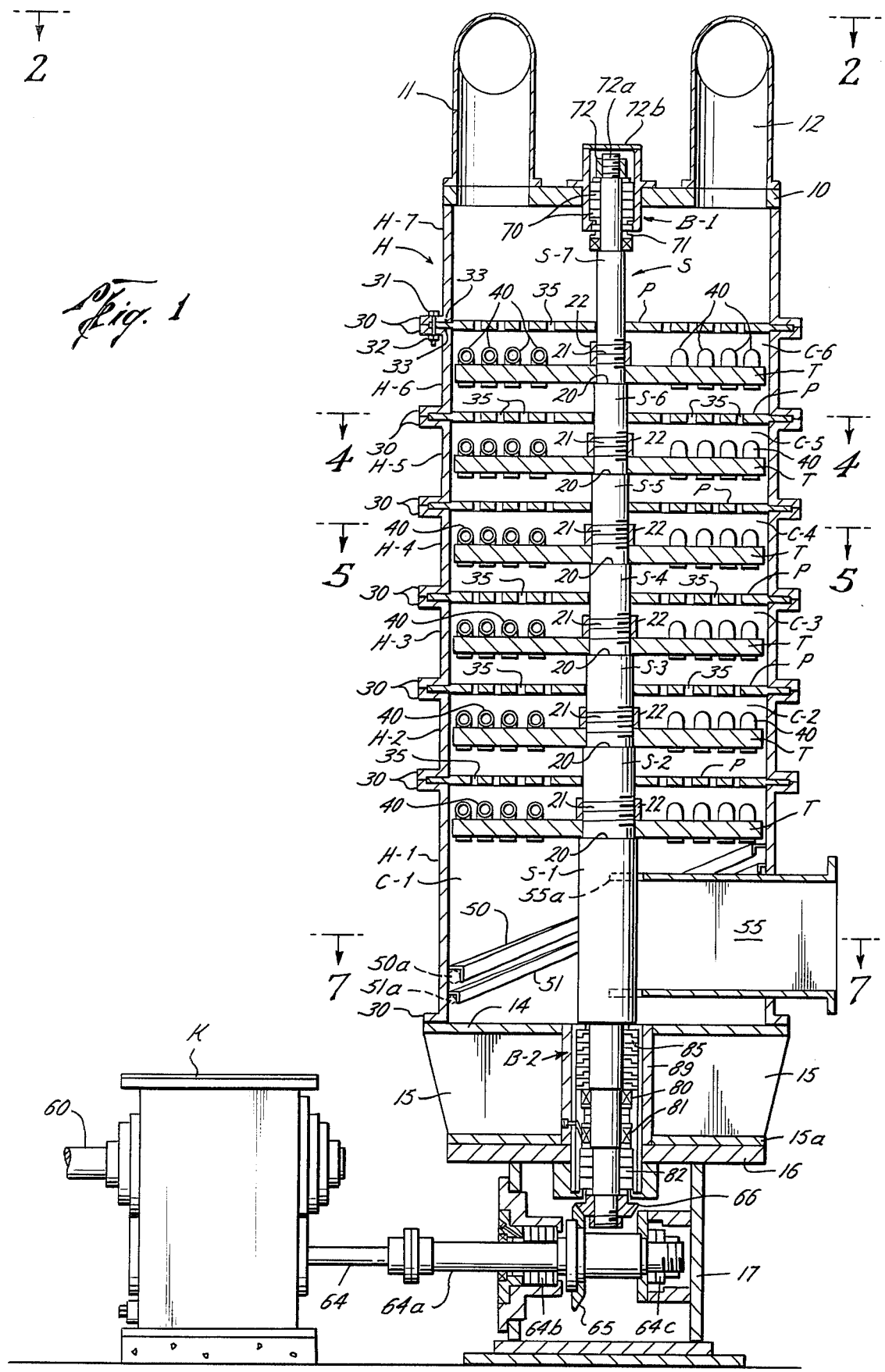
FIG. 1 is a vertical sectional view, partly in elevation, illustrating the apparatus of this invention for use in carrying out the method of this invention.
Figure 2:
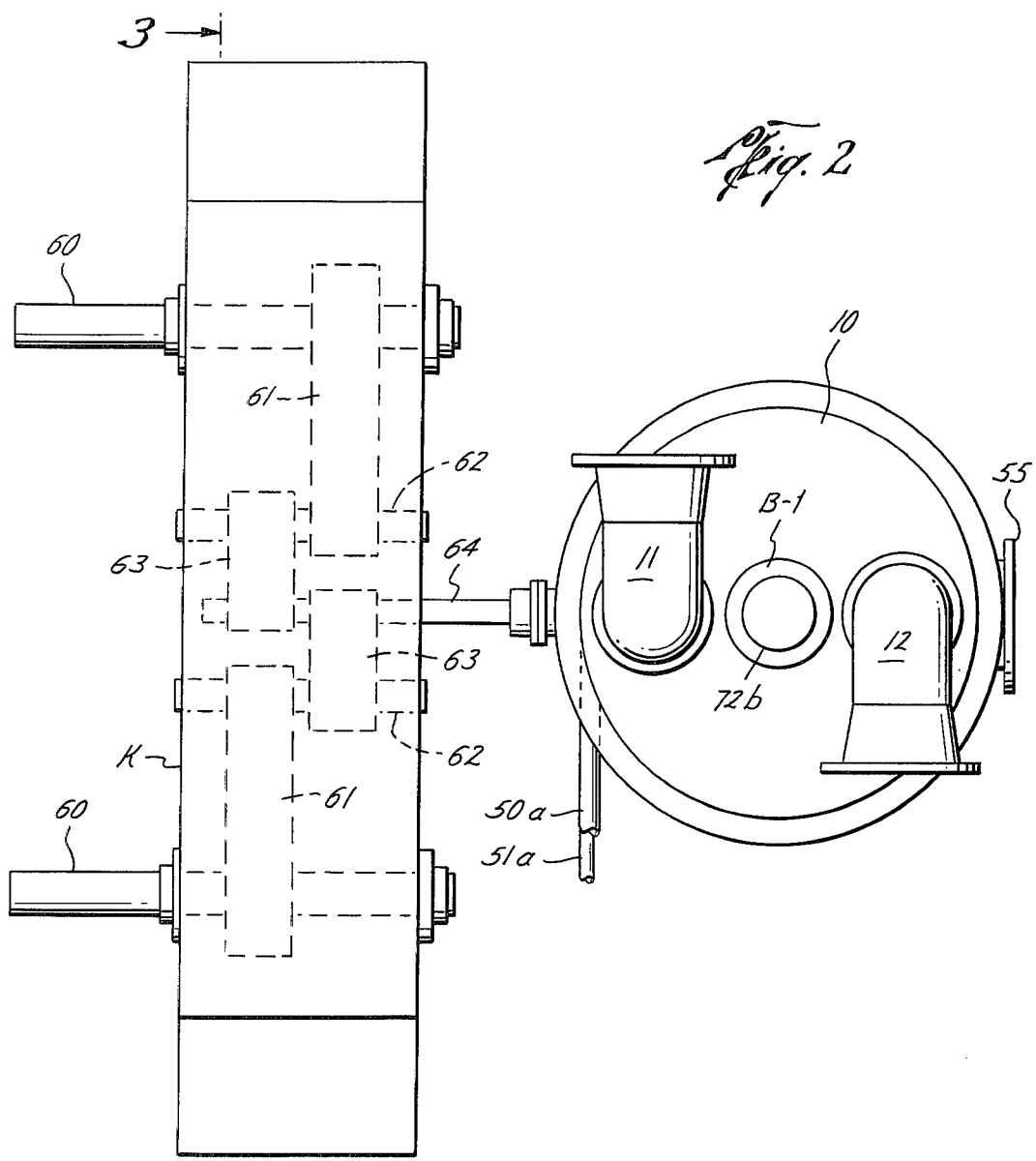
FIG. 2 is a plan view taken on line 2—2 of FIG. 1.
Figure 3:
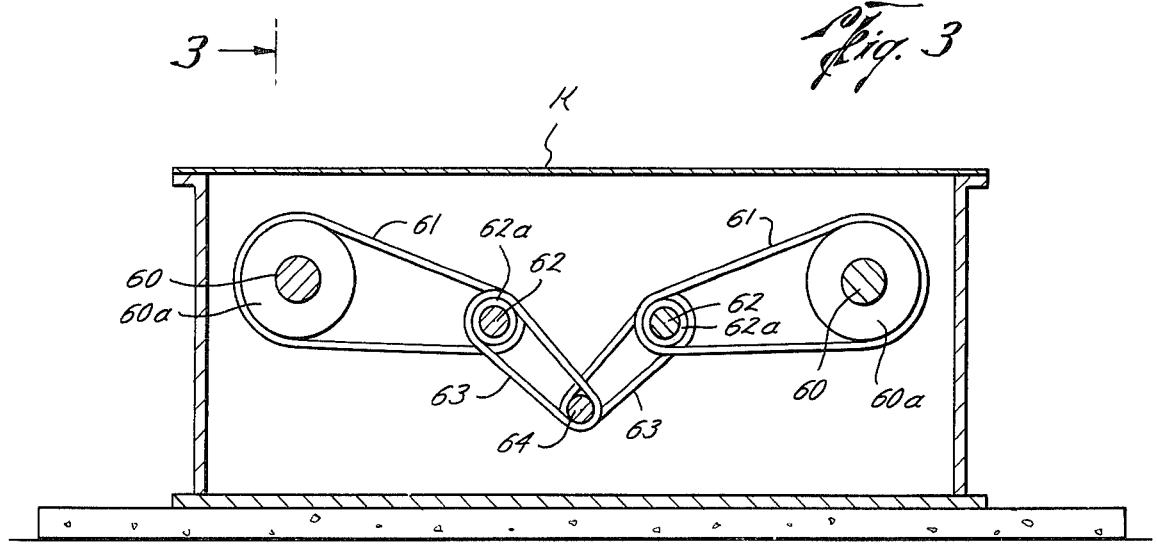
FIG. 3 is an end view taken on line 3—3 of FIG. 2.

The method of this invention is carried out with the apparatus shown generally in the overall assembly drawing of FIG. 1. The apparatus has a housing or chamber body H which is made up of a plurality of body sections H-1, H-2, H-3, H-4, H-5, H-6 and H-7 in the preferred embodiment.

A central rotatable shaft S which has shaft sections S-1 through S-7 of progressively smaller diameters, as will be more fully explained, is disposed centrally within the housing H. The upper end of the shaft S is suitably mounted in a bearing-seal B-1 which is supported by an upper cover plate 10 which closes off the upper end of the housing H except for inlet elbows 11 and 12. The lower end of the shaft S is mounted in another bearing-seal B-2, the details of which will be hereinafter explained. Such seal B-2 is disposed within a central opening of a lower housing closure plate 14 which is connected to and is mounted on a plurality of vertically extending support plates or angle iron members 15 having a lateral, preferably annular lower portion 15a. Such lateral or annular portion 15a is welded or is otherwise secured to the top plate 16 of the gearbox 17, which will be more fully described hereinafter. Each of the shaft sections S-2 through S-7 has a shoulder 20 for receiving a rotatable tray T. Each of the rotatable trays T is mounted on the shaft S, as will be more fully explained and is secured thereto by a nut 22 which is threaded on threads 21 provided just above the shoulder 20 for each of the shaft sections S-2 through S-7. A perforated stop-plate P is disposed above each of the rotatable trays T. Thus, each of the rotatable trays T together with a stop-plate P constitutes a stage of operation of the apparatus which, as illustrated is a multistage operation, with a sufficient number of stages to accomplish the removal of the salt and/or other minerals from the water at the velocities provided by the rotation of the rotatable trays T.

Each of the perforated plates P is fixed against rotation and is bolted or is otherwise secured between annular flanges 30 by plurality of bolts 31, each having a nut 32 therewith. O-ring seals 33 are also provided for each plate P so that when all of the housing sections are assembled the entire housing H is leakproof. It is to be noted that the details of such arrangement with the flanges 30 and the bolts 31 and the seals 33 is illustrated only in the upper left hand part of the housing H, but it will be understood that the same arrangement is used for each of the flanges 30 with each of the housing sections H-1 through H-7. The flanges 30 may either be formed as separate annular rings which are held together by the bolts 31 and nuts 32, or the flanges 30 may be integral with the housing section adjacent thereto. It should also be noted that bolts 31 are shown in FIG. 7 for a portion of the diameter of the flanges at the lower part of the housing H-1 for connecting same to the lower support plate 14. A similar illustration of the bolts 31 are shown in FIGS. 4 and 5 and it will be understood that the bolts 31 extend around the entire circumference of each of the flanges 30, although only a portion are illustrated schematically in FIGS. 4, 5 and 7.

In FIG. 4, one of the plates P is illustrated with the holes or perforations 35 being illustrated in part. The number of perforations is sufficiently large so that, as will be more evident hereinafter, the water or steam, together with the minerals in a separated, suspended state, pass from one chamber to the next in the downward flow thereof. By way of example, there may be eighty to one hundred holes 35 for a typical operating unit. Also, each of the perforated plates P is made in two halves with the line 36 indicating the adjoining edge of the two halves in FIG. 4. Such split construction is for the purpose of assembling the plates P initially on the shaft S, as will be more evident hereinafter, and also for the purpose of disassembly and reassembly for subsequent cleaning, repair and other operations.

A plan view of one of the rotatable trays T is illustrated in FIG. 5, with a portion of the plurality of scoops 40 being illustrated, but it will be understood that there are scoops 40 in the entire area of each of the rotatable plates T as schematically indicated by the dash-dot lines. There are of course a multiplicity of the scoops 40 in each of the indicated circles in FIG. 5, the particular number of which varies with the size and conditions of operation, but in a typical installation, the number of scoops may be about eighty-six.

In FIG. 6, a typical scoop 40 is illustrated in a portion of the tray T. Scoop 40 is shown as extending at an angle of about forty-five degrees with respect to the vertical, although that direction may be changed within the skill of the art. The scoop 40 is essentially a tube which has a vertical opening 40a that is substantially perpendicular to the upper surface of the rotatable tray T and which terminates in an outlet opening 40b which is substantially parallel to the lower surface of the rotatable tray T. Preferably the scoop 40 is welded to the tray T as indicated at 40c and 40d. The tray T is rotated in a direction so that the water or other liquid in the apparatus above each of the trays T is forced through the openings 40a at high jet velocities for discharge from the discharge outlet 40b of each of the scoops 40. Thus, in FIG. 5, the rotation of the rotatable tray T would be in a counterclockwise direction.

A series of chambers C-1 through C-6 are formed by the housing sections H-1 through H-6 and also by the stop-plates above and below each of the trays T except for the lower most tray T. As will be more fully discussed hereinafter, the high speed rotation of the shaft S imparts an extremely high velocity to water which is passing through the housing H. The scoops 40 accelerate that velocity and also generates heat to develop a high enough temperature to vaporize the water as the liquid moves through the various chambers from the upper end to the lower end. The stop plates P provide a semi-restricted flow and prevents a continuing spiraling motion to the fluid which is developed in the area below each tray T as the fluid flows through the housing H from the uppermost chamber to the lowermost chamber.

The lowermost chamber C-1 is preferably an enlarged chamber as compared to the ones thereabove to provide a more unrestricted centrifugal motion beneath the lowermost tray T. Such centrifugal motion accomplishes a final separation of all of the salt and other impurities which have not been separated out in the upper chambers or stages. Also, the centrifugal motion in the lower chamber C-1 causes the solid particles of salt and other minerals and impurities to move to the inner wall of the lower housing section H-1. The solids are guided to discharge by two angle members 50 and 51 which preferably extend in a generally spiral direction for only a portion of the entire inner surface of the housing section H-1 (FIG. 7). The angle iron forming the channel 50 is welded or is otherwise affixed to the inner surface of the housing section H-1 and it communicates at its lowermost part with discharge tube 50a which extends outwardly of the housing section H-1 and may extend to a collection point for the solids. The lower channel 51 is also provided by an angle iron which is welded or is otherwise fixed to the inner surface of the housing section H-1 and it too communicates with a discharge pipe 51a and it also leads to a suitable point for the discharge of solids externally of the housing H.

For the removal of the water vapor from the chamber C-1, a central horizontally disposed outlet tube 55 is provided. Such tube 55 is welded or is otherwise secured in a suitable opening of the housing H-1 and it preferably extends in so that its inlet opening 55a is in close proximity to the shaft S in the vicinity of the shaft section S-1 (FIG. 7). The outlet of the outlet tube 55 is connected by any suitable pipe as indicated at 56 in dotted lines in FIG. 7 for flow to a point of use in the vapor state as steam, or for condensation to water which is substantially free of all salt and other minerals. In general, the denser particle which are the ones that have separated out in the upper stages and which bleed through the perforations are carried along through the lower chamber C-1 and exit through the discharge pipe 50a, whereas the finer or less dense particles, predominately those which are first separated out in the lower chamber C-1, are carried out through the lower discharge pipe 51a. It should be understood that the number of discharge guides and outlets may vary.

For driving the shaft S at high speeds, a great deal of power is required. Preferably, this is provided by two 12V71 Detroit diesel engines, each producing from 350 horsepower to 500 horsepower (not shown) which are pneumatically synchronized and which are equipped with heavy duty mechanical disc type clutches (not shown). The diesel engines are connected to the drive shaft 60 by suitable heavy duty universal joint couplings (not shown). Each drive shaft 60 drives a chain belt 61 which rotates idler shafts 62 for driving chain belts 63 which are suitably connected to a drive shaft 64, which is connected by coupling 64b to shaft 64a having gear 65 thereon in meshing, driving engagement with gear 66 at the lower end of the shaft S. The shaft 64a is suitably mounted in bearings 64b and 64c and they are all disposed within the gear case 17 in oil or other suitable lubricant. It will be understood that the shafts 60 have chain sprockets 60a thereon which engage with the chain 61. Also, sprockets 62a are on the shafts 62 for engagement by the chain belts 61 and 63, and there is a sprocket for each of the chain belts 63 on the shaft 64. By way of example, utilizing the chain case previously described, and with the two engines coupled together, the output speed of 2100 rpm is increased to 6939 rpm on the single output shaft 64. The spiral bevel gear set 65, 66 in the gear box 17 provides for a two to one speed up ratio so as to give the main vertical shaft S a maximum attainable speed of 13,878 rpm which causes the outside surfaces of the trays T to move in excess of 122,622 feet per minute or 1,393.5 miles per hour. In terms of the speed of sound which is indicated as Mach 1, this means that the speed of the trays is in excess of Mach 2 or twice the speed of sound. Because of the high speeds of rotation and the accelerated velocities provided by the scoops 40 on the trays T progressively from the upper to the lower end of the housing H, the water which is introduced into the housing H through the inlets 11 and 12 is increased in temperature as it flows through the housing H so that it becomes water vapor or steam with a temperature range of from 240° F. to above 600° F. in volumes in excess of 5400 gallons per minute. The quantity which is passed through the apparatus and which is discharged will of course depend upon the size of the unit and the speed of rotation of the shaft S.

For supporting the shaft S at such high speeds and to prevent the water vapor or liquid from interfering with such rotation, the upper bearing B-1 includes conventional bearings 70 and a conventional water tight seal 71 below the bearings 70. A nut 72 is suitably threaded on the upper threaded end 72a of the shaft S to position the upper end of the shaft S with respect to the bearings 70 and that is covered by a bearing cap 72b of a suitable configuration.

Figure 8:
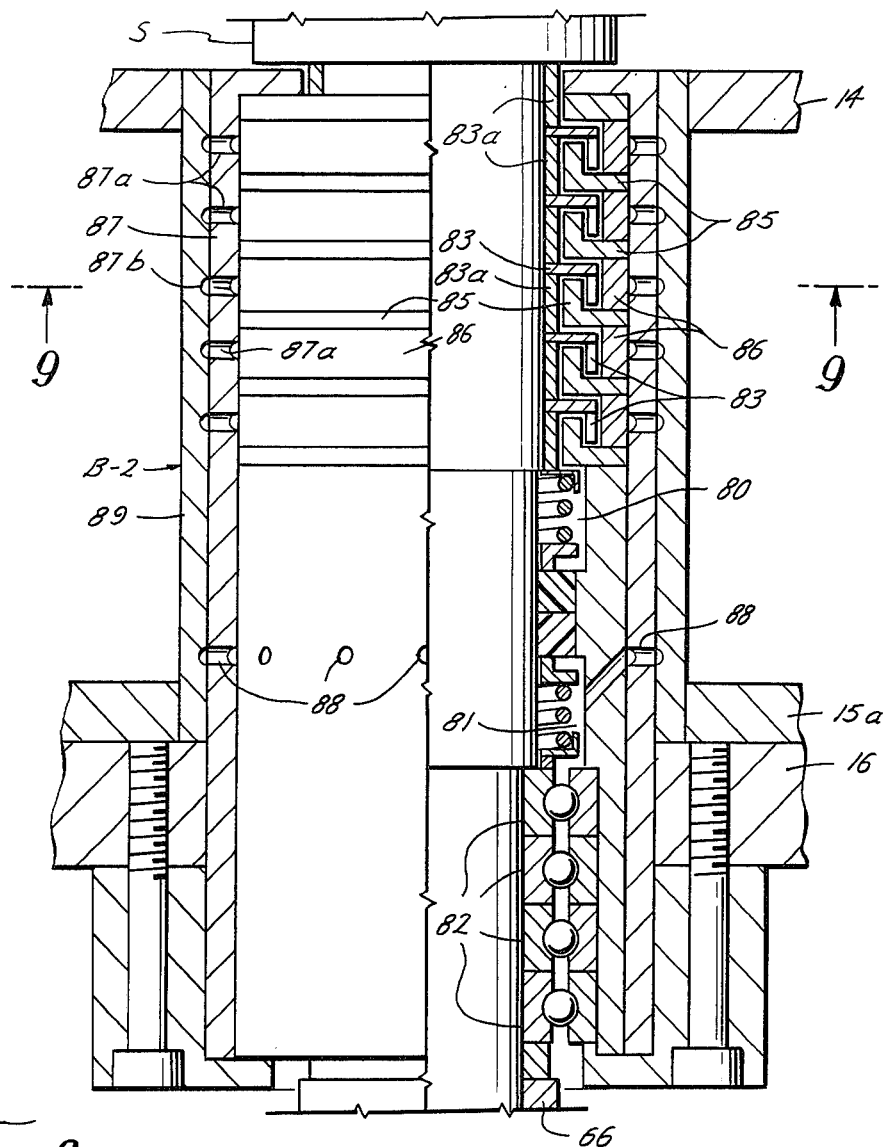
FIG. 8 is an enlarged detailed view of the lower bearing-seal portion of the apparatus illustrated in FIG. 1.
Figure 9:
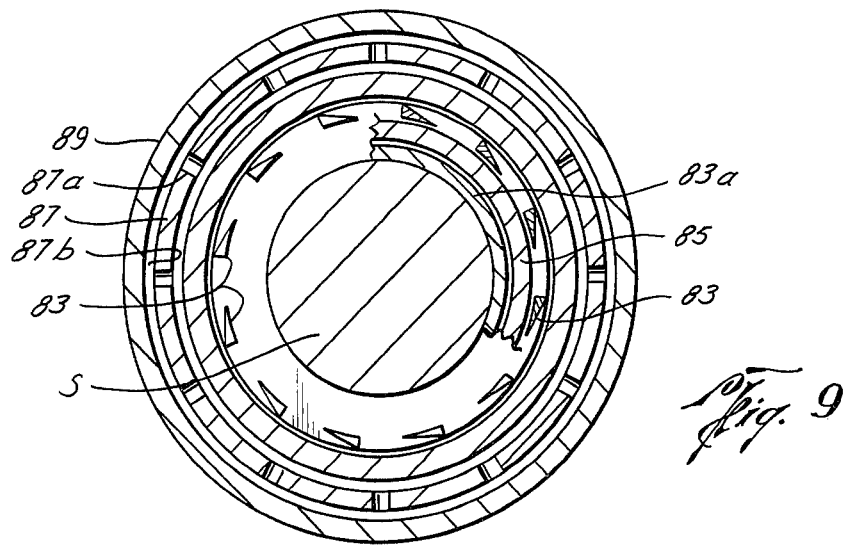
FIG. 9 is a sectional view taken on line 9—9 of FIG. 8.

The lower end of the shaft S is provided with a special bearing-seal B-2 which is shown in particular in FIGS. 8 and 9. Such special bearing-seal B-2 includes two conventional oil seals 80 and 81 which are positioned above conventional bearings 82. A special pressure generating seal is formed above the oil seal 80 by a plurality of rotating glands 83 which are press-fit on the shaft S between rings 83a for rotation with the shaft S. The downward extending portions of such rotating glands 83 are triangular shaped in cross-section as indicated in FIG. 9 so that they are similar to fan blades which work inside of L-shaped fixed members 85 and rings 86 which do not move. The high speed rotation of the shaft S imparts a high speed rotation to the glands 83 to create a pressure which is in excess of the steam pressure in the chamber C-1 located thereabove so as to prevent the steam and solids from exiting downwardly into the area of the bearings 82. Each of the gland sections is equipped with a bleed-off port 87a in sleeve or mandrel 87 to prevent either overpressuring or the forming of a vacuum behind the seals 80 and 81 that could overpower the oil seals 80 and 81 that protect the bearings 82. For this purpose, ports 88 are provided in proximity to the oil seals 80 and 81 which are in communication with bleed-off ports 87a by reason of the clearance 87b indicated between the outer cylinder 89 and the inner cylinder 87 (FIG. 9).

In the use of the apparatus of this invention for carrying out the method of this invention, typical salt water such as found in the ocean, bays, gulfs, and other areas, which has salt and other minerals dissolved therein is introduced into the apparatus at the inlet openings 10 and 12 at the upper end of the housing H. The shaft S is rotated as previously described at extremely high speeds, preferably above Mach 2. As the water flows from the uppermost end of the housing H to the lowermost part thereof, the water is caused to flow through each of the perforated stop plates P and each of the chambers successively downwardly to the lowermost chamber C-1. The rotatable trays T scoop the water through the jet scoops or tubes 40 which are positioned throughout each of the trays T and impart an accelerated velocity or speed to the liquid or vapor and the suspended minerals therewith. The spiraling motion imparted to the water or water vapor by the scoops 40 is changed to a substantially vertical flow through the holes or perforations 35 in each of the stop plates P which assists in the separation of the solids from the water or water vapor and permits the solids to bleed through the plates P.

Such separation and suspension of the salt and other minerals with the water and/or water vapor continues as the flow proceeds downwardly through the housing H, but in the last stage in the chamber C-1, the lowermost rotatable tray T discharges into a relatively large space without any stop plate P therebelow. This imparts a centrifugal separating force in the final stages of the flow through the housing H to cause the solid particles such as salt and other minerals to move to the outer extremity of the chamber C-1 and to follow the guide channels 50 and 51 so as to discharge through the tubes 50a and 51a. As previously noted, the more dense solids will discharge through the upper tube 50a while the lighter or finer solids will discharge through the tube 51a. The water vapor discharges through the discharge or outlet tube 55 and passes to a point of use as steam or to a condensation point for condensing to pure water having virtually no salt or other minerals therewith. Thus, the water is potable or drinkable as compared to the entering salt water.

As can be appreciated from the foregoing, the present apparatus and method produces the potable water from salt water efficiently and in relatively large quantities in a short period of time so that it is practicable for large scale operations.

The foregoing disclosure and description of the invention are illustrative and explanatory thereof, and various changes in the size, shape and materials as well as in the details of the illustrated construction may be made without departing from the spirit of the invention.

I claim:

1. A method for removing dissolved salt and other minerals from water, comprising the steps of:
   introducing water having dissolved salt and other minerals therewith into a housing;
   flowing the water having dissolved salt and other minerals therewith through a series of stages formed of a series of rotatable trays alternately separated by a series of fixed stop plates in the housing;
   heating the water in each successive tray and stop plate stage to effect the vaporization of the water to produce water vapor having at least some of the dissolved salt and other minerals separated from and suspended in the water vapor, substantially solely by rotating the trays at a sufficiently high velocity;
   swirling the water vapor, salt and minerals to exert a centrifugal force on the water vapor and the salt and minerals to physically separate the salt and minerals from the water vapor within the housing; and,
   thereafter removing the separated salt and minerals from the housing apart from the water vapor.

2. The method of claim 1, wherein said rotating is at the high velocity of at least Mach 2.

3. The method of claim 1, including the steps of:
   creating a spiralling flow at accelerated speeds at each of said stages; and
   changing the spiralling flow motion to substantially vertical flow after each of said stages except for the final stage where the centrifugal separating force effects the physical separation of the minerals from the water vapor.

4. The method of claim 1, including:
   cooling the water vapor after the removal of the minerals to provide potable water.

5. The method of claim 1, wherein:
   essentially all of the minerals in the water are separated and removed from the water.

* * * * *